United States Patent Office 3,133,972
Patented May 19, 1964

3,133,972
SELECTIVE REDUCTION OF AROMATIC DISULFIDES
Carl E. Handlovits and Harry A. Smith, Midland, Mich., and Robert W. Lenz, Framingham, Mass., assignors to The Dow Chemical Company, Midland, Mich., a corporation of Delaware
No Drawing. Filed Jan. 10, 1962, Ser. No. 165,320
8 Claims. (Cl. 260—609)

This invention relates to a selective reduction process and it relates particularly to the reduction of certain aromatic disulfides to the corresponding mercaptides.

Disulfides are easily reduced to mercaptans and a variety of known reducing agents have been used for the purpose. Illustrative of this reaction is the reductive cleavage of simple disulfides by reaction with metal hydrides, with zinc and hydrochloric acid, with aluminum isopropoxide, and with alkali metals in various forms such as sodium sulfide, sodium in ethanol, and sodium dissolved or dispersed in liquid ammonia or organic solvents. Substituted disulfides, however, may present special problems which cannot be overcome by the use of these known methods. For example, sodium and other alkali metals as conventionally used in reductions are disadvantageous when applied to the reductive cleavage of halogenated aromatic disulfides because there is a tendency for the alkali metal to react with the halogen atoms present and split them from the aromatic nucleus to make the sodium halide and the unsubstituted mercaptide.

It has now been found that a halogenated aromatic disulfide may be reductively cleaved to the corresponding mercaptide without significant loss of halogen by reacting it in an inert solvent solution with a solvated complex formed between an alkali metal and a polynuclear aromatic compound. The reaction is rapid and complete, one molecule of disulfide reacting with two atoms of alkali metal as contained in the metal complex to make two molecules of the corresponding alkali metal mercaptide which precipitates as an easily separable solid. The mercaptide may be converted to the free mercaptan if desired by acidification.

At about the melting point of the alkali metal, the metal complex breaks down and forms a dispersion of the free alkali metal. The reaction, therefore, can be carried out at any temperature below this point so long as the temperature is high enough to maintain the reaction mixture substantially in the liquid state. The reaction is most specific at lower temperatures and it is preferably run at about 0-30° C.

The metal complexes are prepared by reacting an alkali metal with a polynuclear carbocyclic aromatic compound dissolved in an aliphatic ether having in its molecular structure a ratio of not more than four carbon atoms to one ether oxygen atom. By aliphatic ether is meant both open chain alkyl ethers and cycloalkyl ethers wherein the ether oxygen is a heterocyclic atom. Included in this class of ethers are methyl ethers of lower aliphatic alcohols, these being exemplified by dimethyl ether, methyl ethyl ether, methyl isopropyl ether, methylal, 1,2-dimethoxyethane, diethylene glycol dimethyl ether, and the like, and also saturated heterocyclic ethers such as tetrahydrofuran, dioxane, dioxolane, and similar compounds. The complex thereby formed is an etherate, that is, it contains one or more molecules of loosely bound ether solvent per molecule of complex. The reduction is then accomplished by combining the complex solution and the disulfide. Preferably, the complex solution is added to the disulfide.

Any of the alkali metals may be used but lithium, sodium, or potassium is preferred. Most of the complexes thus formed contain one atom of alkali metal bound to one molecule of aromatic compound, but in some cases the molecular complex contains two or more metal atoms. An amount of aromatic compound is used at least molecularly equivalent to the quantity of metal present and usually a slight excess is preferred, since the presence of such excess in the complex solution does no harm while any excess of free alkali metal could be detrimental in the reduction.

Compounds suitable for forming alkali metal complexes include polynuclear aromatic hydrocarbons such as biphenyl, naphthalene, anthracene, phenanthrene, naphthacene, benzpyrene, tetraphenylethylene, diphenylethylene, and similar substances and also substituted polynuclear compounds, for example benzophenone, naphthonitrile, fluorenone, and the like. The simpler aromatic polynuclear hydrocarbons such as naphthalene, phenanthrene, and anthracene are ordinarily employed.

These alkali metal complexes have a number of advantages over other reducing agents which might be used. For example, where metal hydrides or free alkali metals are often explosively reactive with water and produce hydrogen, the alkali metal complexes are comparatively mild in reaction with water and hydrogen is often not a product. The complexes are simple and inexpensive to prepare and the only by-product in the disulfide reduction is the aromatic component of the complex which remains dissolved in the ether solution.

The halogenated aromatic disulfides which may be reduced to the corresponding halogenated aromatic mercaptans by this process include phenyl, tolyl, naphthyl or other aromatic hydrocarbon disulfides having one or more halogen atoms substituted on the aromatic nuclei. By halogen is meant any of the halogens, that is, fluorine, chlorine, bromine, or iodine. Compounds illustrative of the class include bis(p-bromophenyl) disulfide, bis(chlorophenyl) disulfide, bis(3-chloro-m-tolyl) disulfide, bis(4-chloro-2-naphthyl) disulfide, bis(fluorophenyl) disulfide, bis(iodophenyl) disulfide, bis(dichlorophenyl) disulfide, and related compounds.

The concentration of the reactants in the solution is not critical and is limited only by the solubility of the metal complex in the ether used in its preparation. For convenience in operation, relatively dilute solutions are preferred, for example, those containing about 0.1–1.0 gram atom of alkali metal as its complex per liter of solution. It is similarly most convenient to use the disulfide reactant as a solution in such a solvent or other inert solvent as described below.

The reaction solvent is preferably the ether in which the metal complex was prepared. The solvent may include a minor proportion, that is, less than 50 percent by volume, of an inert solvent such as toluene, xylene, or the polynuclear aromatic compound used to form the alkali metal complex.

The proportion of metal complex to the disulfide used in carrying out a reduction is also not critical although it is usually most convenient to use about the theoretical amount of one mole of disulfide to two atoms of alkali metal. Any unreacted excess of either reactant remains dissolved in the reaction solution and does not interfere with the separation of the precipitated mercaptide product.

The following examples illustrate various specific embodiments of the principle of the invention but are not intended to define its scope.

*Example 1*

A 1-liter, three-necked flask equipped with a stirrer, gas inlet and outlet tubes, and an outlet tube terminating in a fritted glass filtering disc positioned in the bottom of the flask was flushed with dry nitrogen and approximately 500 ml. of tetrahydrofuran was distilled in from another flask containing the solvent and a preformed sodium-naphthalene complex. To this dry solvent there was added 5.0 g. of freshly cut sodium and 5.0 g. of naphthalene, whereupon the blue color of the sodium-naphthalene complex appeared almost immediately. After the mixture had been stirred for 3–4 hours, the resulting deep blue solution of the complex was forced through the fritted disc and the connected outlet tube into a flask containing a solution of 3.8 g. of bis(p-bromophenyl) disulfide in 500 ml. of dry tetrahydrofuran. The reaction appeared to be instantaneous with immediate precipitation of a solid which was filtered off in a dry box, washed with dry ethyl ether, and dried under vacuum. The dry solid was found to be pure sodium p-bromothiophenate with no sodium bromide present. The yield was nearly quantitative.

*Example 2*

A 250 ml. flask was charged with 75 ml. of tetrahydrofuran purified as in Example 1, 0.75 g. of freshly cut potassium, and 4.56 g. of purified anthracene. The mixture was stirred overnight at room temperature to give a deeply colored solution. This solution was filtered into a flask containing a solution of 5.05 g. of bis(p-bromophenyl) disulfide in 25 ml. of purified tetrahydrofuran and the whole was stirred at room temperature for one hour. The precipitated solid was filtered, washed and dried. The dry solid obtained was the pure potassium salt of p-bromothiophenol representing a 93.1% yield based on the original disulfide.

*Example 3*

By the procedure of Examples 1 and 2, a complex prepared from 3.8 g. of sodium and 21.2 of naphthalene in tetrahydrofuran was reacted with 20.0 g. of bis(p-fluorophenyl) disulfide, the reaction being carried out at room temperature for one hour in a total of 350 ml. of tetrahydrofuran. The tetrahydrofuran was removed from the reaction mixture by evaporation and the residue was taken up in benzene. The insoluble portion was filtered, washed with ethyl ether, and dried. A total of 14.76 g. of sodium p-fluorothiophenate with a purity of 91.5% was obtained. This represented a yield of 62.5% based on the original disulfide.

*Example 4*

By the procedure of the foregoing examples, a sodium-naphthalene complex prepared in tetrahydrofuran from 1.5 g. of sodium and 8.37 g. of naphthalene was reacted with 17.1 g. of bis(p-iodophenyl) disulfide for one hour at room temperature. The salt was precipitated with benzene, filtered, washed, and dried. The product was 9.12 g. of pure sodium p-iodothiophenate.

The relatively low yields in Examples 3 and 4 were caused largely by the use of impure disulfides together with some handling losses. No sodium halide or other evidence of dehalogenation was found in these experiments.

Results similar to those of the above examples are obtained by the reaction of other alkali metal complexes with similar disulfides under conditions as previously specified. Variations in concentration and the type of solvent used for the disulfide reactant affect mainly the rate of reaction rather than the nature of the product obtained.

We claim:

1. A process for reducing a halogenated aromatic hydrocarbon disulfide to the corresponding halogenated aromatic mercaptide, which process comprises reacting by contacting in inert solvent solution said disulfide with the molecular complex etherate formed by reacting an alkali metal with a polynuclear carbocyclic aromatic compound dissolved in a saturated ether having in its molecular structure a ratio of not more than four carbon atoms to one ether oxygen atom and selected from the group consisting of an open chain alkyl ether and a heterocyclic ether wherein the ether oxygen is the heterocyclic atom.

2. The process of claim 1 wherein the alkali metal is sodium.

3. The process of claim 1 wherein the alkali metal is potassium.

4. The process of claim 1 wherein the reaction temperature is 0–30° C.

5. The process of claim 1 wherein one mole of disulfide is reacted with about two atoms of alkali metal as contained in the alkali metal-polynuclear aromatic compound molecular complex etherate.

6. The process of claim 1 wherein the polynuclear aromatic compound is naphthalene.

7. The process of claim 1 wherein the polynuclear aromatic compound is anthracene.

8. A process for reducing a halogenated aromatic hydrocarbon disulfide to the corresponding halogenated aromatic mercaptide, which process comprises reacting by contacting in inert solvent solution at 0–30° C. one mole of said disulfide with about two atoms of sodium as contained in a sodium-naphthalene complex etherate formed by reacting sodium with naphthalene dissolved in a saturated ether having in its molecular structure a ratio of not more than four carbon atoms to one ether oxygen atom and selected from the group consisting of an open chain alkyl ether and a heterocyclic ether wherein the ether oxygen is the heterocyclic atom.

No references cited.